United States Patent [19]

Kimura

[11] Patent Number: 4,799,390
[45] Date of Patent: Jan. 24, 1989

[54] SNOW-WEATHERING TEST APPARATUS FOR SELF-PROPELLED VEHICLE

[75] Inventor: Chugo Kimura, Tokyo, Japan

[73] Assignee: Kabushiki-Kaisha Toyo Seisakusho, Tokyo, Japan

[21] Appl. No.: 24,458

[22] Filed: Mar. 11, 1987

[51] Int. Cl.⁴ .......................................... G01M 17/00
[52] U.S. Cl. .................................................. 73/865.6
[58] Field of Search ........................... 73/117.1, 865.6; 239/14.1, 14.2, 2.2; 62/121, 74; 219/213, 201; 37/227

[56] References Cited

U.S. PATENT DOCUMENTS

| H229 | 3/1987 | Phillips | 73/865.6 |
|---|---|---|---|
| 1,465,028 | 8/1923 | Stacey, Jr. | |
| 2,471,733 | 5/1949 | Fiduccia | 37/227 |
| 2,571,069 | 10/1951 | Shearman | 62/121 |
| 2,699,614 | 1/1955 | Welch | 219/201 |
| 2,703,488 | 3/1955 | Gevantman et al. | |
| 2,968,164 | 1/1961 | Hanson | 62/121 |
| 3,074,191 | 1/1963 | Zierak | 37/227 |
| 3,259,466 | 7/1966 | Jacks, Jr. | |
| 3,488,681 | 1/1970 | Mita et al. | |
| 3,508,030 | 4/1970 | Julie | |
| 3,521,029 | 7/1970 | Toyooka et al. | 219/201 |
| 4,062,503 | 7/1986 | Hile et al. | |
| 4,275,833 | 6/1981 | Fairbank | 239/2.2 |
| 4,282,181 | 8/1981 | Pierce | |
| 4,465,230 | 8/1984 | Ash | 239/2.2 |
| 4,667,522 | 5/1987 | Kawahara | |

FOREIGN PATENT DOCUMENTS

| 0024548 | 2/1977 | Japan | 73/865.6 |
|---|---|---|---|
| 0158535 | 9/1982 | Japan | |
| 0184944 | 11/1982 | Japan | 73/865.6 |
| 0184945 | 11/1982 | Japan | 73/865.6 |
| 0184943 | 11/1982 | Japan | |
| 0264273 | 2/1970 | U.S.S.R. | |
| 1083039 | 3/1984 | U.S.S.R. | |
| 1237876 | 6/1986 | U.S.S.R. | 62/74 |

Primary Examiner—Stewart J. Levy
Assistant Examiner—Robert R. Raevis
Attorney, Agent, or Firm—Sandler & Greenblum

[57] ABSTRACT

A snow-weathering test apparatus for a self-propelled vehicle, comprises: a low-temperature testing chamber; a water-spraying unit provided with a truck having a wheel, on which truck is mounted a two-fluid injection nozzle for spraying water with an air-jet into a mist, which water-spraying unit is movably provided in the low-temperature testing chamber; a cooling unit provided with an air-feed duct connected between the low-temperature testing chamber and the cooling unit to feed a cooling air issued from the cooling unit to the low-temperature testing chamber; an air-return duct connected between the low-temperature testing chamber and the cooling unit to permit the cooling air to return to the cooling unit from the low-temperature testing chamber; and a snow-catching unit provided with a heating unit, for catching a snow carried by the cooling air from the low-temperature chamber, which heating unit is employed to melt the snow caught by the snow-catching unit.

7 Claims, 2 Drawing Sheets

SNOW-WEATHERING TEST APPARATUS FOR SELF-PROPELLED VEHICLE

BACKGROUND OF THE INVENTION

1. Field of the Invention

The present invention relates to a testing apparatus for checking various properties such as durability, performances and the like of a self-propelled vehicle, especially of an automobile under a snowy atmosphere.

2. Description of the Prior Art

An artificial snowfall apparatus is already known. A conventional one produces an artificial snowfall under a substantially wind-free condition, and is employed in a snow-weathering test of a house. In such a conventional snowfall apparatus, a water-spraying nozzle is provided in an upper portion of the apparatus and sprays water into a mist which is frozen into ice while falling to produce an artificial snowfall. However, such a conventional apparatus is not one that lends itself to the snow-weathering test of the automobile which is a travelling article. In addition, in such a conventional apparatus, it is not possible to conduct the snow-weathering test of the automobile in its driving condition because of a limited narrow testing space inherent in the conventional apparatus, particularly as to snowstorm-weathering tests of predetermined portions of the automobile.

Further, when vehicles, buildings and like articles are subjected to such snow-weathering tests in conventional environmental testing apparatus, snow is carried by an atmosphere stream and is sucked into an air-conditioning unit, i.e., into a cooler, such that snow adheres to the unit, resulting in decreased cooling and air-feeding performance. This makes it difficult to produce a continuous, long-term, artificial snowfall in the apparatus. In order to achieve such a snowfall, it has been suggested to mount a stationary, air permeable screen, within an air-sucking opening of an air-conditioning unit which sucks air confined in the testing chamber, for the purpose of catching snow carried by the air in front of the air-conditioning unit. In this suggested structure, in order to prevent such screen from being clogged with the snow, there has been provided a snow-trapping equipment produced by the applicant of the present invention, which equipment is provided with a rotary brush brought into contact with a surface of the screen adapted for scraping the snow adhered thereto. However, in this snow-trapping equipment, there is a problem in that the thus scraped snow is again carried by the atmospheric stream or deposited on a foor of the testing chamber.

SUMMARY OF THE INVENTION

It is an object of the present invention to provide a snow-weathering test apparatus for a self-propelled vehicle, which apparatus makes it possible to conduct various snow-weathering tests for the self-propelled vehicle, particularly for the automobile in a relatively limited narrow space defined in the testing chamber of the apparatus while the automobile is kept stationary.

It is another object of the present invention to make it possible that an artificial snowstorm is produced in the testing chamber of the apparatus and to make it possible that the automobile is subjected to a snowstorm-weathering test.

It is still further another object of the present invention to produce a dry and quality snow by spraying water with air into a mist by the use of a two-fluid injection nozzle, which mist is frozed into ice to form a snow immediately after injection thereof.

It is another object of the present invention to catch a snow carried by a recycling atmospheric flow of a cooling air issued from a cooler in front of the same, so as to decrease an amount of deposition of the snow on the cooler for improving its performance and making its flow-resistance as low as possible.

In order to accomplish the above objects of the present invention, according to the present invention is provided: a snow-weathering test apparatus for a self-propelled vehicle, comprising: a low-temperature testing chamber; a water-spraying unit provided with a truck having a wheel, on which truck is mounted a two-fluid injection nozzle for spraying water with an air-jet into a mist, said water-spraying unit being movably provided in said low-temperature testing chamber; a cooling unit provided with an air-feed duct connected between said low-temperature testing chamber and said cooling unit to feed a cooling air issued from said cooling unit to said low-temperature testing chamber; an air-return duct connected between said low-temperature testing chamber and said cooling unit to permit said cooling air to return to said cooling unit from said low-temperature testing chamber; and a snow-catching unit provided with a heating means, for catching a snow carried by said cooling air from said low-temperature testing chamber, said heating means being employed to melt said snow caught by said snow-catching unit.

DESCRIPTION OF THE PREFERRED EMBODIMENT

Figure 1:
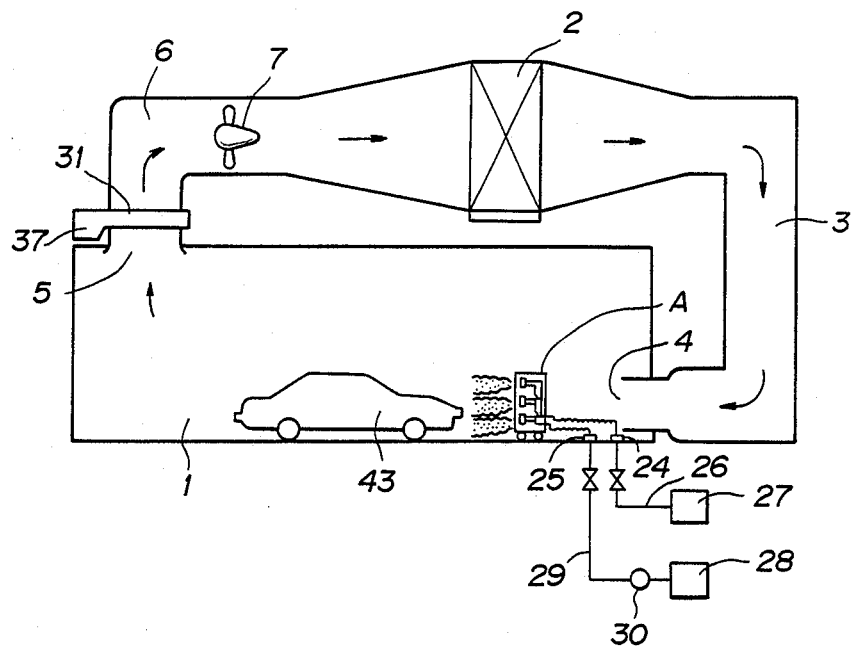
FIG. 1 is a general view of the snow-weathering test apparatus of the present invention.

Now, the present invention will be hereinbelow described in detail with reference to an embodiment thereof shown in the drawings.

In FIG. 1, the reference numeral 1 denotes a snow-weathering testing chamber.

In this testing chamber 1, a cooling air cooled to a temperature below freezing point of water by means of a cooling unit 2, passes through an air-feed duct 3 and is discharged from an air-discharging opening 4 of the duct 3 into the testing chamber 1. The air thus fed into the testing chamber 1 is sucked into an air-return duct 6 through its air-sucking opening 5 which opens into the testing chamber 1, so that the thus sucked air is returned to the cooling unit 2 by means of a fan 7, in which cooling unit 2 the air is cooled again. Such cooled air, i.e., cooling air is fed again to the air-feed duct 3. The air-discharging opening 4 of the air-feed duct 3 laterally opens into the testing chamber 1 at a lower portion of a side wall thereof to enable the cooling air to be discharged substantially laterally into the testing chamber 1.

Figure 2:
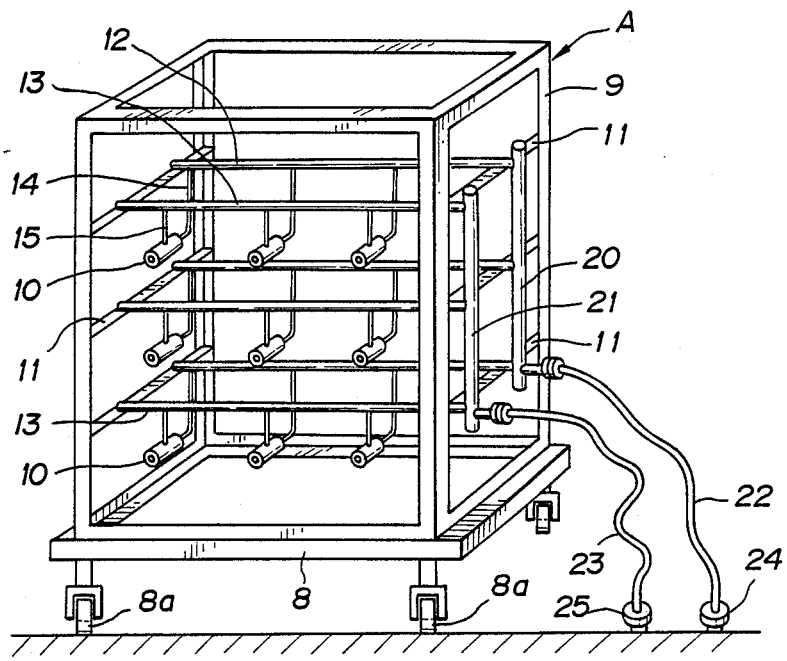
FIG. 2 is a perspective view of the water-spraying unit of the testing apparatus of the present invention.

In FIG. 2, the reference numeral "A" denotes a water-spraying unit provided with a truck 8 having a plurality of wheels 8a, on which truck 8 is vertically provided a framework 9 on which are laterally disposed a plurality of two-fluid injection nozzles 10 for spraying water with an air-jet into a mist.

More particularly, in the framework 9, there are provided a plurality of stays 11 supporting both of air-headers 12 and water-headers 13 which are connected with the nozzles 10 through air-branch pipes 14 and water-branch pipes 15, respectively.

Figure 3:
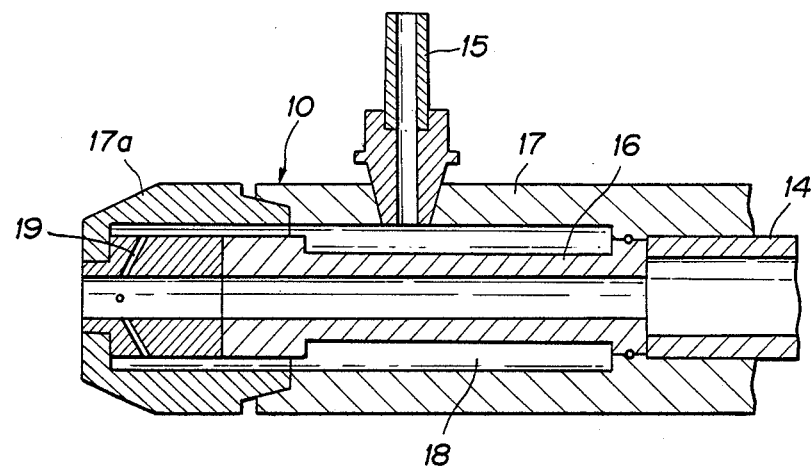
FIG. 3 is a longitudinal sectional view of the two-fluid injection nozzle employed in the testing apparatus of the present invention.

The nozzle 10 has, for example, a construction shown in FIG. 3, in which construction, an inner pipe 16 is connected with the air-branch pipe 14, while an outer pipe 17 is connected with the water-branch pipe 15, so that the nozzle 10 has a double-pipe structure. The outer pipe 17 of the nozzle 10 is closed at front end with a cap 17a, while there is provided in a front end of the inner pipe 16 a thin hole 19 communicating a space defined between the inner pipe 16 and the outer pipe 17 with a front end portion of an axial bore of the inner pipe 16.

Consequently, the air-jet issued from the front end of the inner pipe 16 makes a pressure in the axial bore of the inner pipe 16 drop off to produce a negative pressure therein, so that a water fed to the space 18 defined between the inner pipe 16 and the outer pipe 17 is sucked into the thin hole 19 communicating with the axial bore of the inner pipe 16 under the influence of such negative pressure produced in the axial bore of the inner pipe 16, whereby the thus sucked water is sprayed outward from the front end of the inner pipe 16 into a mist.

The air-header 12 and the water-header 13 are connected with an air-base header 20 and a water-base header 21, respectively. These air-base 20 and water-base 21 headers are connected with an air-feed 24 and a water-feed 25 joints provided in the testing chamber 1 through an air 22 and a water 23 hoses, respectively.

The air-feed joint 24 is connected with an air compressor 27 through an air-feed pipe 26, while the water-feed joint 25 is connected with a water tank 28 through a water-feed pipe 29 provided with a water pump 30.

In FIG. 1, the reference numeral 31 denotes a snow-catching unit provided in the air-return duct 6.

Figure 4:
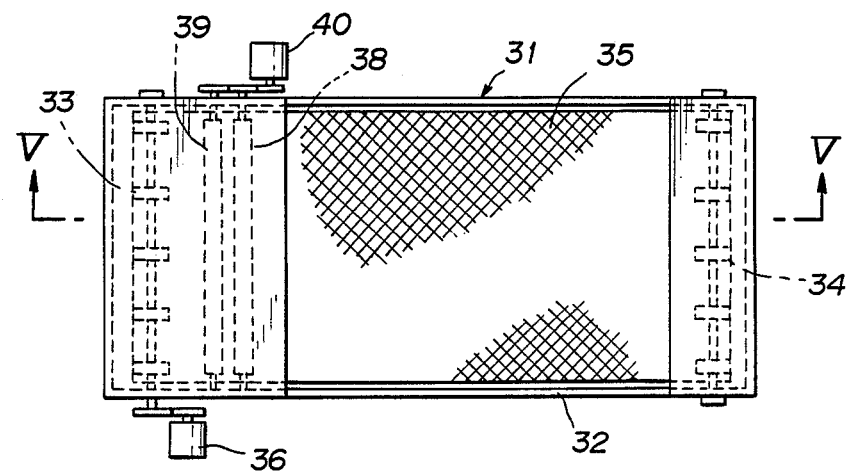
FIG. 4 is a plan view of the snow-catching unit employed in the testing apparatus of the present invention.
Figure 5:
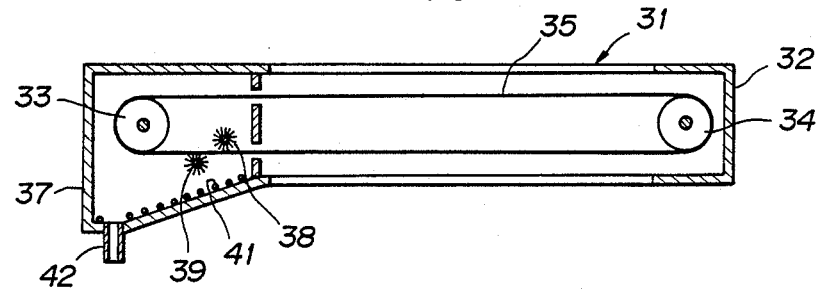
FIG. 5 is a longitudinal sectional view of the snow-catching unit shown in FIG. 4.

An example of the snow-catching unit 31 has a construction as shown in FIGS. 4 and 5, in which construction, a framework 32 of the snow-catching unit 31 is provided with a rotatable drive-roller 33 at its front portion and a rotatable driven-roller 34 at its rear portion, respectively. There is provided around these drive-roller 33 and the driven-roller 34 a snow-catching purpose endless air-permeable screen belt 35 running around these rollers 33 and 34. The drive-roller 33 is rotatably driven by a motor 36 to rotatably drive the screen belt 35 which travels across the air-return duct 6.

The snow-catching unit 31 is provided with a portion which projects outward from the air-return duct 6 to form a snow-reservoir 37 in which are provided an upper 38 and a lower 39 rotary brushes forming snow-scraping scraping means for scraping a snow adhered to the screen belt 35, which rotary brushes 38 and 39 are driven by another motor 40.

In the snow-reservoir 37, there is provided an electric heater 41 for melting the snow scraped from the screen belt 35 by the use of the rotary brushes 38 and 39. At a bottom portion of the snow-reservoir 37 is provided a drainage pipe 42 for draining a water which is produced by melting the scraped snow by the user of the electric heater 41.

Incidentally, in FIG. 1, the reference numeral 43 denotes an automobile to be tested.

The above embodiment of the snow-weathering test apparatus has the following advantages:

In a low-temperature testing chamber 1 of the apparatus, the water-mist injected with the air-jet from the water-spraying unit "A" is immediately frozen into ice which assumes a powder snow-like form. Consequently, it is possible to conduct the snow-weathering test and the snowstorm-weathering test of the automobile in the apparatus by placing the water-spraying unit "A" in the vicinity of an article being tested, i.e., the automobile 43 to spray the water-mist on the automobile 43.

In addition, since the water-spraying unit "A" is a mobile type to make it possible to place the water-spraying unit "A" at any position in the testing chamber 1, it is possible to conduct the snowstorm-weathering tests of the automobile 43 at its front, rear and side portions by only changing the position of the water-spraying unit "A" while the automobile 43 stays still.

As described in the above, in case that the portion being tested of the automobile 43 is changed, it is not required to move the automobile 43, which makes it possible that the test is conducted in the testing chamber 1 having a narrow testing space, and also makes it possible to prevent the interior of the testing chamber 1 from being contaminated with the exhaust gas issued which is issued from the automobile 43 while moved in the testing chamber 43 for changing its testing portion.

In addition, since the snow-weathering test apparatus of the present invention makes it possible to conduct localized tests of each of predetermined portions of automobile 43, such localized tests lead to a savings of water consumed in the test. Further, since the water is sprayed with the air-jet from the two-fluid nozzle 10 into the water-mist in the low-temperature testing chamber 1, it is immediately frozen into ice assuming the snow-like form in a storm.

In addition, the snow carried by the cooling air sucked into the air-return duct 6 from the testing chamber 1 is caught by the snow-catching unit 31 provided in a position in front of the cooling unit 2, so that the snow is substantially prevented from adhering to the cooling unit 2 to permit the cooling unit 2 to be operated at full capacity.

Further, since the snow caught by the screen belt 35 of the snow-catching unit 31 is scraped by the rotary brushes 38 and 39 of the snow-catching unit 31 and then melted by the use of the heating means 41 of the unit 31 into water which is drained from the unit 31, there is no fear that the scraped snow is carried by the cooling air to the cooling unit 2, so that the adhesion of the snow onto the cooling unit 2 is decreased to the least possible amount.

What is claimed is:

1. A snow-weathering apparatus for evaluating the reaction of a self-propelled vehicle to snow conditions, said apparatus comprising:
   (a) a low-temperature testing chamber;
   (b) a water spraying unit positioned on a movable truck supported by a plurality of wheels, said truck including at least a dual-fluid injection nozzle system comprising means for spraying water with an air jet in the form of a mist, said water spraying unit being movably positioned within said low-temperature testing chamber;

(c) a cooling unit and an air-feeding duct which connects the interior of said low-temperature testing chamber and said cooling unit, said duct comprising means for feeding cool air issued by said cooling unit to said low-temperature chamber;

(d) an air-return duct connected to both said low-temperature testing chamber and to said cooling unit, said air-return duct comprising means for conducting cooling air back to said cooling unit from said testing chamber; and (e) a snow catching unit positioned within said air-return duct, said snow catching unit including a heating member, said snow catching unit comprising means for catching snow carried by cooling air from said low-temperature testing chamber, said heating member comprising means for melting snow caught by said snow catching unit, said snow catching unit further including an upper opening, a substantially endless movable belt for retaining said snow, and means for removing snow melted by said heating member from said snow catching unit.

2. Apparatus in accordance with claim 1, wherein said heating member comprises an electric heater adapted to melt snow from said belt, said belt comprising an endless screen, said snow catching unit further comprising at least one inclined surface on which said electric heater is positioned and a plurality of rotary brushes for cleaning snow from said screen, and a generally downwardly positioned tubular conduit attached to a bottom portion of said inclined surface of said snow catching unit, said conduit comprising means for evacuating melted snow from the interior of said unit.

3. Apparatus in accordance with claim 2, said rotary brushes being driven by a motor in order to scrape snow from said endless belt.

4. Apparatus in accordance with claim 3, wherein said water spraying unit includes a framework having a plurality of stays for supporting a plurality of air and water headers connected with a plurality of nozzles via air conducting pipes and water conducting pipes, respectively.

5. Apparatus in accordance with claim 4, further comprising an air feed hose and a water feed hose connected to respective air and water headers.

6. Apparatus in accordance with claim 1, further comprising a fan, wherein said snow catching unit is positioned substantially adjacent to an entrance of said air return duct into which air fed into said testing chamber is sucked back into said cooling unit by said fan.

7. An apparatus for testing the responsiveness of a self-propelled vehicle to snow conditions, said apparatus comprising:

(a) a low-temperature testing chamber;

(b) a water spraying unit positioned on a movable truck supported by a plurality of rolling wheels, said truck including at least a dual-fluid injection nozzle assembly comprising means for spraying water with an air jet in the form of a mist, said water spraying unit being movably positioned within said low-temperature testing chamber;

(c) a cooling unit having an air feeding duct fluidly connecting the interior of said low-temperature testing chamber with said cooling unit, said duct further comprising means for feeding cool air issued by said cooling unit into said low-temperature chamber;

(d) an air-return duct fluidly connecting said low-temperature testing chamber to said cooling unit, said air-return duct comprising means for conducting cooling air to said cooling unit from said testing chamber;

(e) a snow catching unit positioned within said air-return duct, said snow catching unit including a heating device, said snow catching unit further comprising means for catching snow carried by cooling air from said low-temperature testing chamber, said heating device comprising means for melting snow caught by said snow catching unit, said snow catching unit further including an upper opening, a substantially endless movable screen for retaining said snow, and means for removing snow from said screen, said snow removing means comprising a plurality of rotatable screen-scraping brushes, and said heating device comprising means for melting snow removed from said endless screen, wherein said melting means comprises an electric heater positioned on an inclined lower surface of said snow catching unit, and a generally downwardly positioned tubular conduit attached to a bottom portion of said inclined surface of said snow catching unit, said conduit comprising means for evacuating melted snow from the interior of said unit.

* * * * *

UNITED STATES PATENT AND TRADEMARK OFFICE
CERTIFICATE OF CORRECTION

PATENT NO.  : 4,799,390

DATED       : January 24, 1989

INVENTOR(S) : Chugo KIMURA

It is certified that error appears in the above-identified patent and that said Letters Patent is hereby corrected as shown below:

In the Abstract, line 2, change ",comprises" to ---comprising---.

In the Abstract, line 10, change "a cooling" to ---cool--- before "air".

In the Abstract, line 13, change "cooling" to ---cool--- before "air".

In the Abstract, line 16, change "unit" to ---device--- after "heating".

In the Abstract, line 16, delete "a" before "snow".

In the Abstract, line 17, change "cooling" to ---cool---.

In the Abstract, line 18, change "unit" to ---device--- after "heating".

At column 1, line 8, change "performances" to ---performance---.

At column 1, line 14, delete "," after "condition".

At column 1, line 31, change "atmosphere" to ---atmospheric---.

At column 1, line 33, delete "," after "unit".

At column 1, line 38, change "an air-sucking" to ---the air-suction---.

At column 1, line 43, delete "a" after "provided".

At column 1, line 45, change ",which" to ---; this---.

At column 1, line 50, change "a foor" to ---the floor---.

At column 1, line 56, change ",which" to ---; this---.

At column 2, line 1, change "frozed" to ---frozen---.

At column 2, line 1, delete "a" after "form".

At column 2, line 4, delete "a" before "snow".

At column 2, line 4, "a" (third occurrence);

UNITED STATES PATENT AND TRADEMARK OFFICE
CERTIFICATE OF CORRECTION

PATENT NO. : 4,799,390

DATED : January 24, 1989

INVENTOR(S) : Chugo KIMURA

It is certified that error appears in the above-identified patent and that said Letters Patent is hereby corrected as shown below:

At column 2, line 6, change "an amount of deposition of the snow" to ---the amount of snow deposition---.

At column 2, line 10, change "according to" to ---accordingly,---.

At column 2, line 10, change "is provided:" to ---provides---.

At column 2, line 20, change "a cooling" to ---cool--- before "air".

At column 2, line 24, change "cooling" to ---cool--- before "air".

At column 2, line 28, change "means" to ---device---.

At column 2, line 53, change "a cooling air" to ---air,---.

At column 2, line 54, insert ---the--- after "below".

At column 2, line 56, change "air-discharging" to ---air-discharge---.

At column 2, line 59, change "air-sucking" to ---air-suction---.

At column 2, line 64, change "air-discharging" to ---air- discharge---.

At column 3, line 8, delete "of" after "both".

At column 3, line 13, delete "construction" after "which".

At column 3, line 17, insert ---the--- after "at".

At column 3, line 19, insert ---,--- after "space".

At column 3, line 20, insert ---,--- after "17".

At column 3, line 23, change "a" to ---the--- before "pressure".

At column 3, line 25, delete "a" before "water".

At column 3, line 36, delete "a" after "and".

UNITED STATES PATENT AND TRADEMARK OFFICE
CERTIFICATE OF CORRECTION

PATENT NO. : 4,799,390

DATED : January 24, 1989

INVENTOR(S) : Chugo KIMURA

It is certified that error appears in the above-identified patent and that said Letters Patent is hereby corrected as shown below:

At column 3, line 38, delete "an" after "through" and "a" after "and".

At column 3, line 46, insert ---,--- after "construction".

At column 3, line 46, delete "construction," after "which".

At column 3, line 50, insert ---,--- after "provided".

At column 3, line 50, change "these" to ---the---.

At column 3, line 51, change "34 a snow-catching purpose endless air-permeable" to ---34, a snow-catching, endless, air-permeable---.

At column 3, line 58, delete "an" after "provided".

At column 3, line 58, delete "a" after "and".

At column 3, line 59, change "scraping means for scraping a snow" to ---means for scraping snow---.

At column 3, line 61, change "35, which" to ---35; these---.

At column 3, line 66, change "37 is" to ---37, there is---.

At column 3, line 67, delete "a" before "water".

At column 4, line 1, change "user" to ---use---.

At column 4, line 8, insert ---,--- after "water-mist".

At column 4, line 9, insert ---,--- after "A".

At column 4, line 10, insert ---,--- after "powder".

At column 4, line 15, insert ---,--- after "43".

At column 4, line 25, change "being tested of the automobile 43" to ---of the automobile 43 being tested---.

At column 4, line 26, change "that the test is conducted" to ---to conduct the test---.

UNITED STATES PATENT AND TRADEMARK OFFICE
CERTIFICATE OF CORRECTION

PATENT NO. : 4,799,390

DATED : January 24, 1989

INVENTOR(S) : Chugo KIMURA

It is certified that error appears in the above-identified patent and that said Letters Patent is hereby corrected as shown below:

At column 4, line 30, delete "issued" after "gas".

At column 4, line 31, change "moved" to ---moving---.

At column 4, line 32, change "43" to ---1--- after "chamber".

At column 4, line 44, insert ---,--- after "1".

At column 4, line 49, insert ---,--- after "35".

At column 4, line 50, insert ---,--- after "31".

At column 4, line 51, insert ---,--- after "39".

At column 4, line 51, insert ---,--- after "31".

At column 4, line 52, change "41" to ---41,---.

At column 4, line 52, insert ---,--- after "31".

At column 5, line 11 (claim 1, line 20), change "cooling" to ---cool--- before "air".

At column 5, line 16 (claim 1, line 25), change "cooling" to ---cool--- before "air".

At column 5, line 24 (claim 2, line 1), insert ---An--- before "Apparatus".

At column 5, line 38 (claim 4, line 1), insert ---An--- before "Apparatus".

At column 5, line 44 (claim 5, line 1), insert ---An--- before "Apparatus".

At column 5, line 45 (claim 5, line 2), change "air feed" to ---air-feed--- and "water feed" to ---water-feed---.

At column 5, line 47 (claim 6, line 1), insert ---An--- before "Apparatus".

At column 6, line 2 (claim 6, line 4), change "air return" to ---air-return---.

At column 6, line 15 (claim 7, line 12), change "air feeding" to ---air-feed---.

UNITED STATES PATENT AND TRADEMARK OFFICE
CERTIFICATE OF CORRECTION

PATENT NO. : 4,799,390

DATED : January 24, 1989

INVENTOR(S) : Chugo Kimura

It is certified that error appears in the above-identified patent and that said Letters Patent is hereby corrected as shown below:

At column 6, line 24 (claim 7, line 21), change "cooling" to ---cool--- before "air".

Signed and Sealed this

Seventh Day of April, 1992

Attest:

HARRY F. MANBECK, JR.

Attesting Officer     Commissioner of Patents and Trademarks